United States Patent
Seto et al.

(10) Patent No.: US 6,658,351 B2
(45) Date of Patent: Dec. 2, 2003

(54) APPARATUS AND METHOD FOR DELIVERING ROAD MAP DATA TO MOVABLE BODY

(75) Inventors: Fumio Seto, Kanagawa (JP); Masayuki Takada, Gunma (JP)

(73) Assignee: Nissan Motor Co., Ltd., Kanagawa (JP)

( * ) Notice: Subject to any disclaimer, the term of this patent is extended or adjusted under 35 U.S.C. 154(b) by 70 days.

(21) Appl. No.: 10/095,012

(22) Filed: Mar. 12, 2002

(65) Prior Publication Data

US 2002/0152022 A1 Oct. 17, 2002

(30) Foreign Application Priority Data

Apr. 11, 2001 (JP) .......................... 2001-112533

(51) Int. Cl.⁷ ............................... G01C 21/00
(52) U.S. Cl. ............. 701/208; 340/995.17; 340/995.15; 705/402
(58) Field of Search ................. 701/208, 200, 701/207, 211; 73/178 R; 340/988, 989, 990, 991, 995.1, 995.11, 995.15, 995.17; 705/80, 400, 402, 500

(56) References Cited

U.S. PATENT DOCUMENTS 6,240,091 B1  5/2001  Ginzboorg et al.
6,317,753 B1  11/2001 McGrath et al.
6,324,471 B1  11/2001 Katayama et al.
6,532,417 B2 *  3/2003  Hatano ........................ 701/207

OTHER PUBLICATIONS

2003/0023376–Fujimoto et al –Jan. 30, 2003–Charging area display apparatus for vehicle and charging area display method for vehicle.*
2003/0083809–Hatano–May 1, 2003–navigtion terminal and method of processing data for a navigation system.*

* cited by examiner

Primary Examiner—William A. Cuchlinski, Jr.
Assistant Examiner—Olga Hernandez
(74) Attorney, Agent, or Firm—McDermott, Will & Emery

(57) ABSTRACT

In apparatus and method for delivering road map data, a plurality of road map data are stored in a road map data storage unit, one of the road map data which corresponds to the road map data requested to be delivered from the road map storage unit is retrieved and delivered in response to a request to deliver the road map data to a movable body issued from the same movable body, a delivery history of each road map data is stored, and a charging process for the delivery of the road map data is carried out in such a way as to refer to the delivery history of the road map data stored and to charge an amount of money discounted from a predetermined amount of money at a rate of discount varied in accordance with a degree of an overlap in a case where the road map data presently delivered to the road map data delivery requested movable body includes a portion on which the road map data delivered to the same movable body in the past is overlapped.

11 Claims, 9 Drawing Sheets

POINT OF PLACE a, c → AREA (1)
POINT OF PLACE b → AREA (2)
POINT OF PLACE e, g → AREA (3)
POINT OF PLACE d, f → AREA (4)

APPARATUS AND METHOD FOR DELIVERING ROAD MAP DATA TO MOVABLE BODY

BACKGROUND OF THE INVENTION

1. Field of the Invention

The present invention relates to apparatus and method for delivering a road map data into any one of movable bodies from which a request to deliver the road map data is issued with a function of a charging process executed for the delivery of the road map data.

2. Description of the Related Art

Navigation systems for automotive vehicles to navigate the vehicles have been placed on a market. In each of the navigation systems, a road map data (also called, a geographical data) is displayed through a display unit installed within a vehicular passenger compartment to guide the vehicle to be traveled to a desired destination. In such navigation systems as described above, a position and a direction of the vehicle which, in general, are detected using a GPS (Global Positioning System), a vehicle speed sensor, and a directional sensor are superimposed on the road map data read from a recording medium such as a CD-ROM or a DVD-ROM and displayed on the display unit.

However, since the road map data previously stored in the record medium such as the CD-ROM or the DVD-ROM is displayed on a display screen of the display unit, in such a navigation system as described above, the road map data which is displayed on the display screen of the display unit becomes different from an actual road situation in a case, for example, where a new road has been opened to a traffic and/or a new building or facility has been built.

In order to cope with such a problem as described above, a, so-called, communication type navigation system has been proposed in which a wireless telecommunication device such as a transceiver is equipped in the vehicle and a latest road map data is downloaded from a road map data delivery device which provides a delivering service on the road map data via a communication device which is enabled to be communicated in a bi-directional communication and the downloaded road map data is displayed on the display screen of the display unit.

In such a communication type navigation system as described above, a predetermined charging process is, ordinarily, implemented to the delivery of the road map data from the road map data delivery device. Methods of implementing the predetermined charging process, for example, include a method of charging an amount of money to a user of the navigation system in accordance with a quantity of the road map data for each of the road map data deliveries and a method of charging a constant amount of money per predetermined period of time for the road map delivery service regardless of the quantity of data delivered. In a case where the quantity of the road map data to be delivered is small, it is advantageous for the user to adopt the former method of charging the amount of money in accordance with the quantity of data for the delivery of the road map data.

SUMMARY OF THE INVENTION

However, if the method of charging the amount of money in accordance with the quantity of data for each delivery of the data were applied to the method of charging the amount of money for the deliver of the road map data to the communication type navigation system, the following problem would occur.

That is to say, in the communication type navigation system described above, a limited area road map data such that, with a present position of the vehicle as a center, a surrounding area to the present position is partitioned by a specified size is, ordinarily, delivered from the road map data delivery device. Hence, suppose a case where the limited area road map data from a point of place A to a destination is to be delivered, as shown in FIG. 12. If the deliver of the road map data at the point of place A is requested from the above-described communication type navigation system, the limited area road map data of an area α is delivered. In order to acquire a sufficient amount of the limited area road map data to the destination, the delivery of the road map data may be requested at a time point at which the vehicle has moved to a point of place B so as to acquire the limited area road map data of an area β with point of place B as a center. In this case, however, the vehicle needs to be moved with no presence of the road map data during a run of the vehicle from point of place A to point of place B. This gives an anxious feeling to a vehicle driver (viz., the user).

To avoid such an inconvenience as described above, it is necessary to request a delivery of the road map data when the vehicle has reached to a terminal point C of the area α so as to acquire the limited area road map data of an area γ with terminal point C as a center. In this case, area γ has a large overlapped portion on area α and road map data on area γ includes data which are of a low utility value for the user. In the way described above, it gives an unsatisfactory feeling to the user that the same amount of money as the delivery of the road map data of area α is charged for the delivery of the road map data of area γ.

In addition, since it is difficult to accurately determine an arrival of the vehicle at terminal point C of area α, a case where the delivery of the road map is requested before the vehicle has arrived at terminal point C may be considered. In this case, since the delivered road map data includes many data of a further lower utility value, it is very disadvantageous to charge the same amount of money for the delivery of such a road map data as described above as that when the road map data of area α is delivered.

Even in a case where the road map data is delivered as a mesh data, the same problem occurs when the vehicle is moved on a zigzag road as shown in FIG. 13. That is to say, in an example of FIG. 13, when the delivery of the road map data is requested at a point of place c, the mesh data of the same area (1) as that when the delivery of the road map data is requested at a point of place a is resulted to be delivered. When the delivery of the road map data is requested at a point of place f, the mesh data of the same area (4) as that when the delivery of the road map data is requested at a point of place d. When the delivery of the road map data at the point of place g is requested, the mesh data of the same area (3) as that when the delivery of the road map data is requested at a point of place e is resulted to be delivered.

As described above, the user largely dissatisfies with the charge for the delivery of the mesh data of the same area by the same amount of money in spite of the fact that the mesh data of the same area has been delivered.

It is, hence, an object of the present invention to provide apparatus and method for delivering road map data which give a high convenience for the user by carrying out an appropriate charging process in accordance with a utility value of the road map data.

According to one aspect of the present invention, there is provided a road map data delivering apparatus comprising: a road map data storing section in which a plurality of road map data are stored; a road map data delivering section that, in response to a request to deliver the road map data to a movable body issued from the same movable body, retrieves one of the road map data which corresponds to the delivery requested road map data and delivers the retrieved road map data to the same movable body; a delivery history storing section in which a delivery history of each road map data through the road map data delivering section is stored; and a charging process section that executes a charging process for the delivery of the road map data carried out by the road map data delivering section in such a manner as to refer to the delivery history of the delivered road map data stored in the delivery history storing section and to charge an amount of money discounted from a predetermined amount of money at a rate of discount varied in accordance with a degree of an overlap in a case where the road map data presently delivered to the road map data delivery requested movable body includes a portion on which the road map data delivered to the same movable body in the past is overlapped.

According to another aspect of the present invention, there is provided a road map data delivering method comprising: storing a plurality of road map data; in response to a request to deliver the road map data to a movable body issued from the same movable body, retrieving one of the road map data which corresponds to the delivery requested road map data; delivering the retrieved road map data to the same movable body; storing a delivery history of each road map data delivered in a delivery history storing section; and executing a charging process for the delivery of the road map data in such a manner as to refer to the delivery history of the delivered road map data and to charge an amount of money discounted from a predetermined amount of money at a rate of discount varied in accordance with a degree of an overlap in a case where the road map data presently delivered to the road map data delivery requested movable body includes a portion on which the road map data delivered to the same movable body in the past is overlapped.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
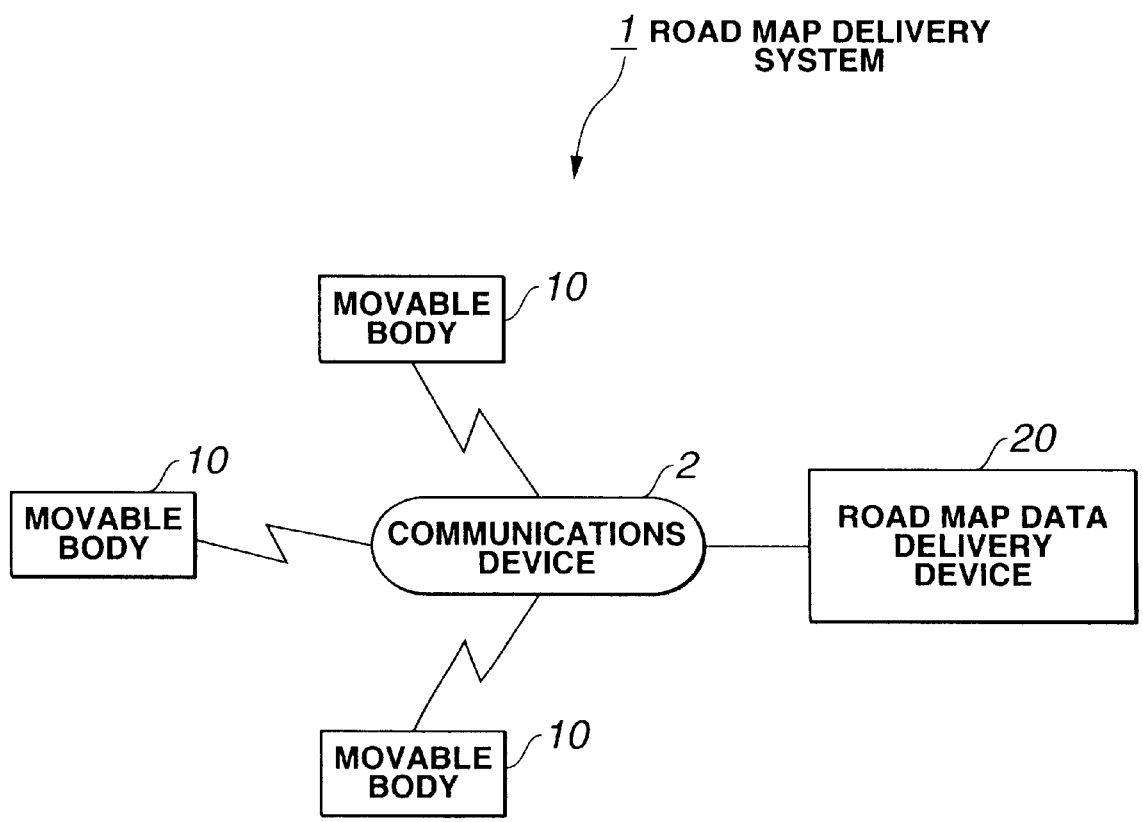
FIG. 1 is a schematic block diagram of a rough configuration of a road map data delivery system to which a road map data delivering apparatus according to the present invention is applicable.
Figure 2:
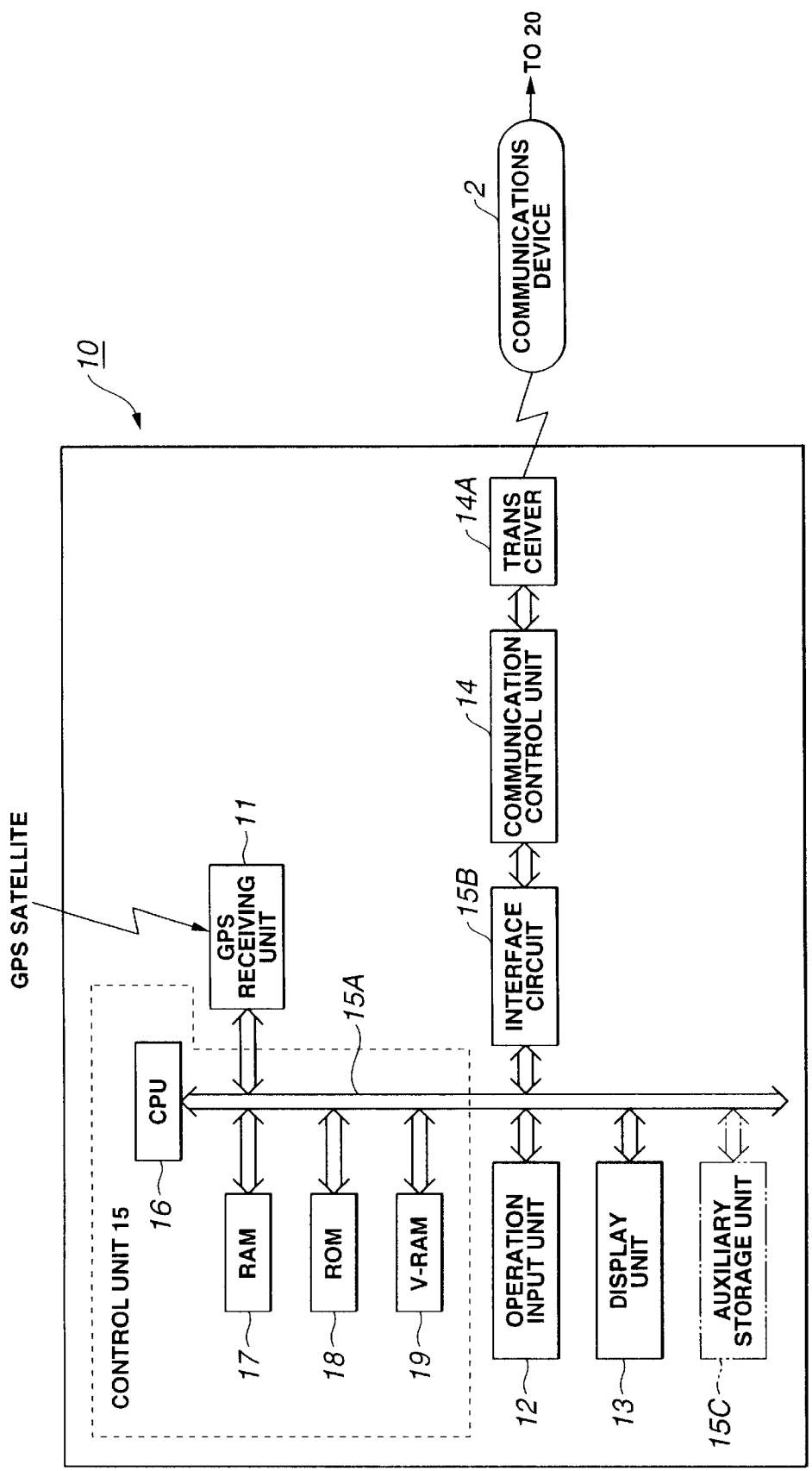
FIG. 2 is a block diagram representing a configuration of a typical one of movable bodies shown in FIG. 1.

A road map data delivering apparatus according to the present invention serves to deliver a road map data (geographical data) to a movable body in response to a request to send the road map data from the movable body such as an on-vehicle navigation system, a handy phone, or a portable personal computer and to implement a charging process (or called, billing or accounting process) for the delivery of the road map data. FIG. 1 shows a rough configuration of a road map data delivery system 1 to which the road map delivery apparatus according to the present invention is applicable.

In road map data delivery system 1 shown in FIG. 1, a plurality of movable bodies 10 (or called mobiles) are connected wirelessly to a wireless communications device 2 which can enable road map data delivery system 1 shown in FIG. 1 to implement bi-directional communications between the respective movable bodies 10 and a road map data delivery device 20 to which the road map data delivering apparatus according to the present invention is applicable. Each movable body 10 includes an on-vehicle navigation system with a capability of wireless bi-directional communications, a personal handy phone system terminal, a portable personal computer (or called, portable terminal), and so forth. A message representing a request of a delivery of a road map data from any one or more of the movable bodies 10 is transmitted via communications device 2 to road map data delivery device 20 so that the road map data from road map data delivery device 20 is transmitted to the road map data delivery requested movable body 10 via communications device 2.

Each movable body 10 includes a GPS (Global Positioning System) receiving unit 11 to receive a GPS-signal from any one of a plurality of GPS satellites, an operation input unit 12 which outputs a series of signals indicating an operation input information according to its operation by the user, a display unit 13 which displays various kinds of information including the road map data delivered from road map delivery device 20, a communication control unit 14 which controls communications between each movable body 10 and the road map delivery device 20 and which is connected to a transceiver 14A or equivalent thereof to communicate wirelessly with communications unit 2; and a control unit 15 which controls the whole operation of the corresponding movable body 10.

GPS receiving unit 11 receives GPS signal from any one of GPS satellites to retrieve a positional information representing a present position of the corresponding movable body 10 and a time information representing a present time and supplies the positional and time information to control unit 15.

Operation input unit 12 includes various key buttons and supplies the output signals thereof in accordance with user button operated inputs to control unit 15. It is noted that operation unit 12 may integrally be constructed with display unit 13 in a form of a touch panel type operation input unit.

Display unit 13 is constituted by, for example, a liquid crystal display panel and serves to display various kinds of information including road map data delivered from road map data delivery device 20 via communications unit 2 under a control by means of control unit 15.

Communication control unit 14 transmits the information related to the request of the delivery of the road map data from the corresponding movable body 10 and the information related to movable body 10 via communications device 2 to road map data delivery device 20. In addition, communication control unit 14 receives the information such as the road map data from road map data delivery device 20 via transceiver 14A (antenna inclusive) and communications device 2.

Control unit 15 includes a CPU (Central Processing Unit) 16, RAM (Random Access Memory) 17, a ROM (Read Only Memory) 18, a common bus 15A, and a V-RAM (Video-Random Access Memory) 19. CPU 16 utilizes RAM 17 as a work area, executes an operation program stored in ROM 18 to control the whole operation of the corresponding movable body 10. It is noted that an auxiliary storage unit 15C such as a record medium (for example, CD-ROM or DVD-ROM) is connected to common bus 15A. However, auxiliary storage unit 15C may be omitted from each movable body 10 when each movable body 10 is exclusively used in a wireless communication system (viz., road map data delivery system 1) shown in FIG. 1. Communication control unit 14 is connected to control unit 15 via an interface circuit 15B.

Specifically, control unit 15 in each movable body 10 issues the request to deliver the road map data in accordance with operation inputs by the user through operation input unit 12, acquires various kinds of information on the corresponding movable body 10 such as the positional information and time information supplied from GPS receiving unit 11, and implements the control for the transmission of the road map data delivery request and various kinds of information related to the corresponding movable body 10 from communication control unit 14 to road map data delivery device 20 via communications device 2.

In addition, control unit 15 receives the road map data delivered road map data delivery device 20 via communications device 2 in response to the request to deliver a desired road map data through communication control unit 14 and performs the control such that a pointer (an arrowed mark) representing a position of the corresponding movable body 10 is superimposed on the road map data and the superimposed road map data is displayed on a display screen of display unit 13.

Figure 3:
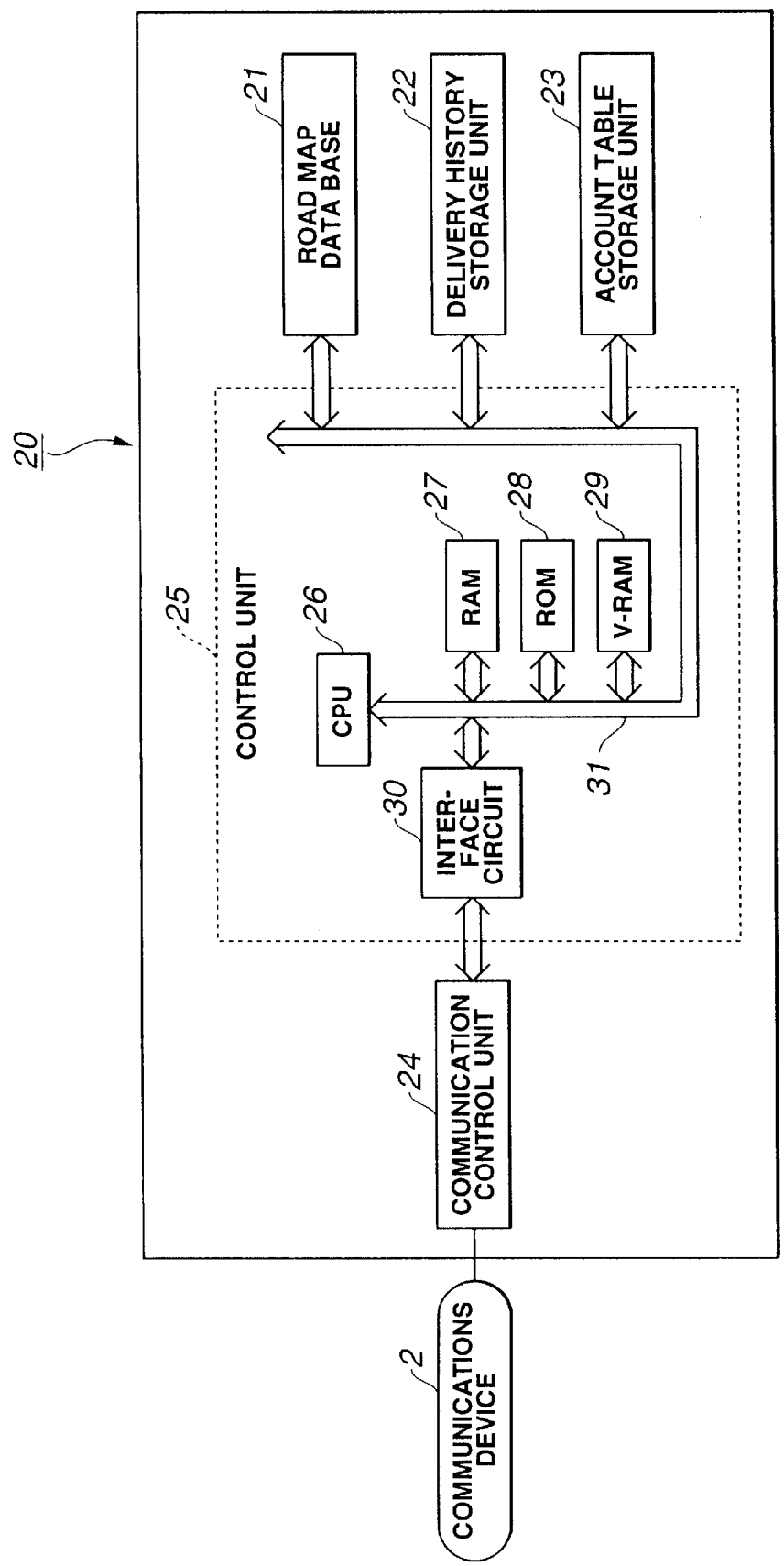
FIG. 3 is a block diagram of a road map data delivery device shown in FIG. 1 to which the road map data delivering apparatus according to the present invention is applicable.

As shown in FIG. 3, road map data delivery device 20 includes: a road map database 21 in which the plurality of road map data are stored; a delivery history storage unit 22 in which delivery histories of the individual road map data to movable bodies 10 are stored; a charge (account) table storage unit 23 in which a charge (or account) table representing a bill is stored for each user; a communication control unit 24 which controls the communications between the road map delivery device 20 itself and each movable body 10; and a control unit 25 which controls the whole operation of the road map data delivery device 20.

Road map database 21 stores all regional road map data to be an object for a road map data delivery service. When control unit 25 specifies the positional coordinates and the size of the road map data, the road map data of the area surrounding the specified positional coordinates which indicate the center of the area of the road map data can be retrieved by the specified size from road map database 21. It is noted that the road map data stored in the road map database 21 are regularly updated so as to always be stored as latest road map data therein.

Delivery history storage unit 22 stores delivery histories of the individual road map data delivered to the individual movable bodies 10 from road map data delivery device 20. It is noted that each delivery history of the road map data includes an information such as an individual ID information allocated to each movable body 10, the positional information and the time information when the request of delivery of the corresponding road map data is issued, and an information on the size (coordinates on four corners of the road map data) of the delivered road map data to the road map data delivery requested movable body 10. That is to say, in road map data delivery device 20, control unit 25 refers to the delivery histories of the road map data stored in delivery history storage unit 22 so as to be enabled to be recognized that what contents of the road map data were delivered in the past time to the corresponding (road map delivery requested) movable body 10. It is noted that any old history data whose stored time indicates an elapse of time for a predetermined interval of time (for example, one month) from a time at which the corresponding history data is stored in the delivery history storage unit 22 from among the delivered histories of the road map data stored therein is deleted (disposed of) from delivery history storage unit 22.

Account table storage unit 23 stores charge (account) tables requesting the users of respective movable bodies 10 to be paid by compensation for the delivery of the road map data. That is to say, in the road map data delivery device 20, when the road map data including a portion thereof on which the road map which was delivered in the past is overlapped is delivered, the charging process is carried out such that an amount of money which is discounted from a predetermined amount of money at a rate of discount varied in accordance with a degree of the overlap of the portion described above on the delivered road map previously delivered (delivered in the past) is charged for the delivery of the road map data described above. Account table storage unit 23 stores each charge table indicating a correspondent relationship between the degree of overlap on the road map data and the amount of money discounted at the rate of discount varied in accordance with the degree of the overlap.

Communication control unit (abbreviated as CCU) 24 receives the delivery request of the road map data from any one of movable bodies 10 and the information related to any one of movable bodies 10 from the corresponding movable body 10 under a control by means of control unit 25 via communications device 2.

Control unit 25 includes CPU 26, RAM 27, ROM 28, V-RAM 29, common bus 31, and an interface circuit 30, as shown in FIG. 3. CPU 26 utilizes RAM 27 as a work area and executes an operation program stored in ROM 28 to control a whole operation of road map data delivery device 20. Specifically, control unit 25 retrieves one of road map data from road map database 21 in response to the request to deliver the same road map data issued from any one of movable bodies 10. At this time, control unit 25 retrieves the road map data of a desired area with a desired size on the basis of the positional coordinates of the corresponding movable body 10 and a requested size of the road map data.

Control unit 25 performs such a control that the retrieved road map data is transmitted to the road map delivery requested one of movable bodies 10 via communications device 2. That is to say, in road map data delivery device 20, control unit 25 has a function as road map data delivering means for retrieving the corresponding road map data in response to the road map data delivery request issued by the road map data delivery requested movable body 10 from road map database 21 and for delivering the retrieved road map data to the road map delivery requested movable body 10.

In addition, control unit 25 delivers the road map data in response to the road map delivery request from any one of movable bodies 10, thereafter, refers to the delivery history of the corresponding road map data to be delivered stored in delivery history storage unit 22, and determines whether the road map data delivered lately, at the present time, to the corresponding one of movable bodies 10 includes the portion of the overlap on that delivered in the past to the same movable body 10. At this time, the determination of whether the lately delivered road map data includes the overlapped portion is carried out with the road map data of the same size as an object to be determined. That is to say, control unit 25 extracts one of the delivery histories of previously delivered road map data of the same size as the presently delivered road map data from among the delivery histories of road map data stored in delivery history storage unit 22 and determines whether the presently delivered road map data includes the overlapped portion of the road map data delivered in the past on the basis of the extracted delivery history.

Thereafter, in a case where control unit 25 determines that the presently delivered road map data includes the portion of the overlap on the road map data delivered in the past, control unit 25 calculates a degree of the overlap (a magnitude of an area of the overlapped portion) as will be described later, refers to the charge table stored in the account table storage unit 23, derives the amount of money at a rate of discount varied in accordance with the degree of the overlap, and carries out the charging process to charge the discounted amount of money for the delivery of the road map data. That is to say, control unit 25 in road map data delivery device 20 has a function as a charging process section that charges the amount of money for the delivery of the road map data.

It is noted that it is desirable not to carry out the charging process for a first delivery of the road map data carried out at first when the delivery requests of the road map data are continued to be issued for a predetermined short period of time (for example, five minutes)and, in response to these delivery requests, the deliveries of the road map data are continued to be carried out by road map data delivery device 20. That is to say, in a case where such continual requests of the deliveries of the road map data from the same mobile body 20 as described above occur, a factor of a cause of such continual requests as described above may be considered to be a case where the user of the corresponding one of movable bodies 10 erroneously maneuvers operation inputs on operation input unit 12 or a case where the size of the first requested road map data is made different from that of the user desired size. Since, even in such cases as described above, the same charging process is performed by control unit 25 so that an excessive economical burden is improved on each user of movable bodies 10, it is desirable not to carry out the charging process for the first delivery of the road map data so as to remedy the operational mistake caused by the user of the corresponding movable body 10.

In the example described above, with the charge table representing the correspondent relationship between the degree of the overlap on the road map data and the amount of money discounted from the predetermined amount of money at the rate of discount varied in accordance with the degree of the overlap stored previously into account table storage unit 23, control unit 25 refers to this charge table, derives the amount of money discounted from the predetermined amount of money at the rate of discount varied in accordance with the degree of overlap on the road map data, and executes the accounting (charging) process for the delivery service of the road map data by the derived amount of money. However, control unit 25 may calculate the amount of money discounted from the predetermined amount of money in accordance with the degree of overlap whenever the portion of the road map data presently delivered is overlapped on the road map data delivered in the past. In addition, in the example described above, the rate of discount is determined on the basis of only the degree of the overlap between the presently delivered road map data and the road map data delivered in the past. However, in addition to the degree of overlap, with a duration in time from a time at which the road map data was previously delivered to a time at which the road map data is delivered at the present time taken into consideration, the rate of discount may be increased as the duration of time becomes shorter. In this way, the rate of discount may be determined with the duration in time from the time at which the past road map data was delivered to the time at which the present road map data is delivered taken into consideration. In this alternative case, a charging process on which a utility value of road map data is further faithfully reflected can be achieved.

As a method of receiving a payment to the charge set through the charging process, a generally available method of an automatic pull down from an account in a financial agency may be adopted. That is to say, control unit 25 generates the charging information and the charging information is transmitted to a server installed in the financial agency via communications device 2 from communication control unit 24 to pull down automatically the charge from a designated account in the financial agency. As described above, the receipt of the payment to the charge can extremely be simplified and efficiently be carried out.

On the other hand, there is often a case where it is desirable to make a determination of whether the road map data is actually received with the charge as a criterion of the determination upon a confirmation of the amount of charge before the movable body 10 actually receives and displays the requested road map data through display unit 13.

In this case, control unit 25 may refer to the corresponding delivery history of the road map data stored in delivery history storage unit 22 at a time point at which the delivery request of the road map data from any one of movable bodies 10 is issued, may determine whether the requested road map data includes the overlapped portion on the previously delivered road map data, and may calculate the degree of the overlap in a case where the overlap portion is present. Then, control unit 25 may refer to the charge table stored in account table storage unit 23, determines the amount of money discounted from the predetermined amount of money at the rate of discount varied in accordance with the degree of the overlap, and may transmit the charging information indicating the determined amount of money using communication control unit 24 to the corresponding movable body 10 via communications device 2. Thus, since control unit 15 in the corresponding movable body 10 displays the charge information transmitted from road map data delivery device 20 through display unit 13, the corresponding amount of money to be charged can be confirmed before the requested road map data is actually received.

Control unit 25 performs the delivery of road map data in response to the delivery request of road map data from any one of movable bodies 10 and, thereafter, performs such a process that the delivery history of the road map data to the corresponding one of movable bodies 10 is stored in the delivery history storage unit 22. Specifically, control unit 25 stores the ID information, positional information, and the information related to the size (specified by coordinates at four corners of road map data) of the road map data delivered to movable body 10. Thus, since the delivery history of the road map data stored in delivery history storing unit 22 is updated so that the latest history data is always stored in the delivery history storing unit 22. It is noted that the history data stored after the predetermined period of time has elapsed is eliminated so as to be excluded from the object of the overlap determination. Thus, it becomes possible to move appropriately determine the utility value of the road map data delivered to movable body 10 delivered to the movable body 10.

Figure 4:
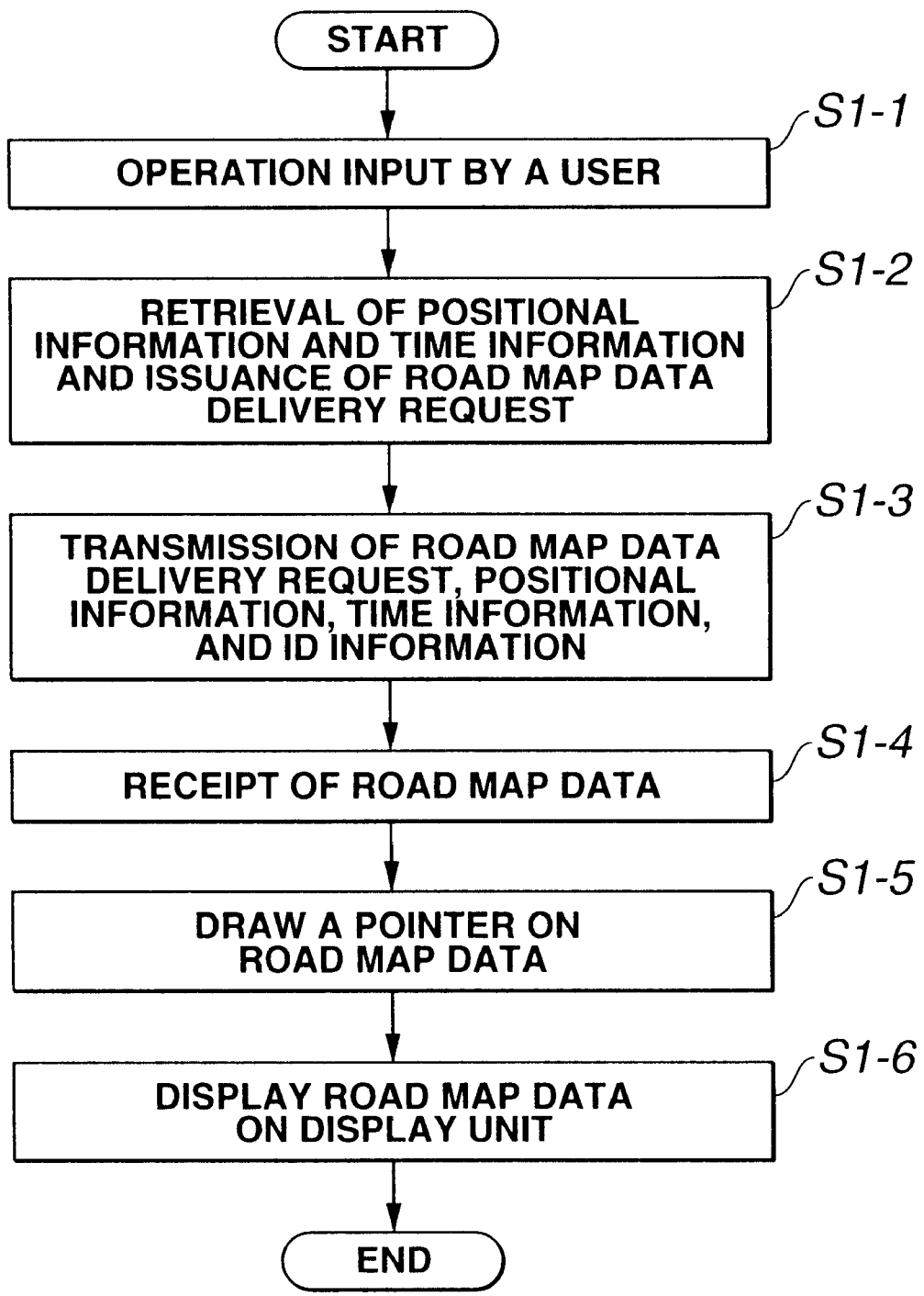
FIG. 4 is a flowchart representing an example of a processing flow executed at any one of movable bodies of the road map delivery system shown in FIG. 1.
Figure 5:
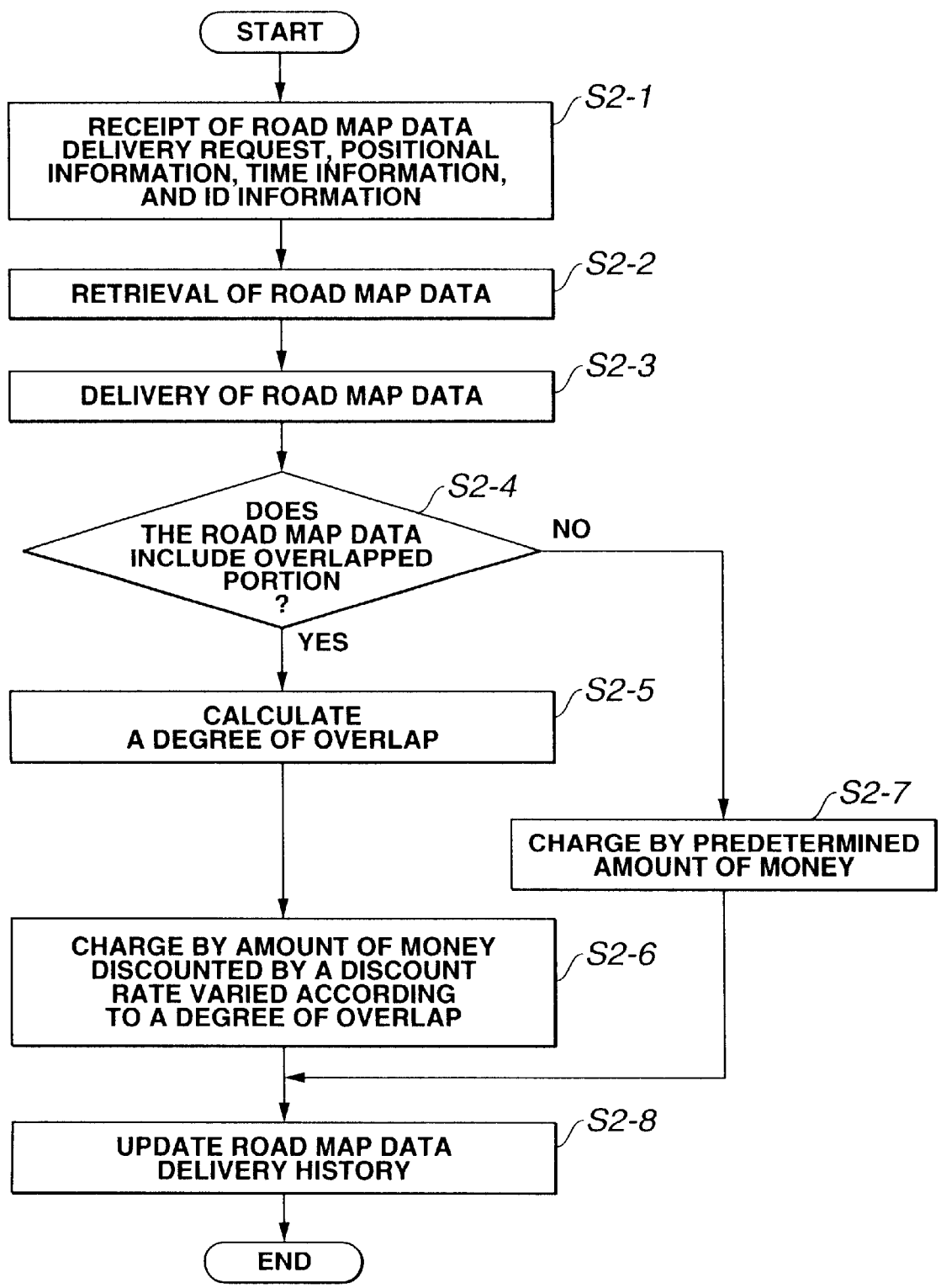
FIG. 5 is a flowchart representing an example of a processing flow executed at the road map data delivery device of the road map data delivery system shown in FIG. 1.

A specific example of a series of processes executed in road map data delivery system 1 will be described with reference to flowcharts shown in FIGS. 4 and 5. FIG. 4 shows a processing flow executed at each movable body 10 and FIG. 5 shows a processing flow executed at road map data delivery device 20.

At a step S1-1, control unit 15 receives a signal which indicates that the road map data of a specified size is to be displayed on display unit 13 and which is generated according to operation inputs by the user through operation input unit 12. At a step S1-2, control unit 15 retrieves positional information indicating the present position of the corresponding movable body 10 and time information indicating the present time from GPS receiver 11 and issues the request to deliver the road map data from road map data delivery device 20 in accordance with the operation input of the user through operation input unit 12.

At a step S1-3, control unit 15 commands communication control unit 14 to transmit the road map data delivery request, the positional information on the corresponding movable body 10, and time information to road map delivery device 20 via communication control unit 20 via communication control unit 2 together with the ID information allocated to movable body 10.

Next, at a step S2-1, when control unit 15 of the corresponding movable body 10 transmits the road map data delivery request, positional information, and ID information, control unit 25 of road map data delivery device 20 receives these pieces of information from communication control unit 24.

When the various kinds of information from the movable body 10 are supplied to control unit 25, control unit 25 analyzes the road map data delivery request, recognizes the size of the road map data that the user of the delivery requested movable body 10 has requested, and recognizes positional coordinates on the present position of the road map data delivery requested movable body 10. At a step S2-2, control unit 25 retrieves the road map data that the user of the movable body 10 is requested from road map database 21. At a step S2-3, the road map data is delivered to the requested movable body 10 from communication control unit 24 via communications device 2. At the movable body side 10, the road map data is delivered via communications device 2 from the road map delivery device 20. At a step S1-4, communication control unit 14 receives the road map data thus delivered and supplies the road map data thus delivered to control unit 15 of the road map data delivered movable body 10.

When the road map data delivered from road map data delivery device 20 is supplied to control unit 15, such a process of drawing the pointer indicating the present position of the road map data delivered movable body 10 on the road map data is carried out by control unit 15. In this case, control unit 15 retrieves the positional information from GPS receiving unit 11, recognizes the positional coordinates indicating the present position of the corresponding movable body 10 by retrieving the positional information, calculates how remote the road map delivery requested movable body 10 is separated from a center position of the road map data with positional coordinates of the center position of the road map data delivered from road map delivery device 20 as a center, and performs the drawing process of the pointer on the road map on the above-described coordinate information.

Figure 6:
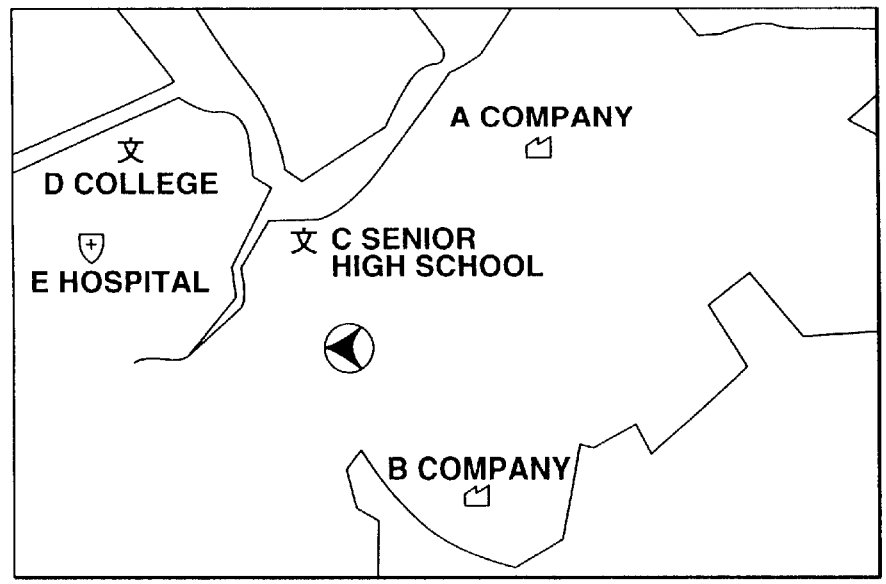
FIG. 6 is an explanatory top view of a road map data which is delivered to any one of movable bodies by the road map data delivering apparatus according to the present invention and on which a pointer indicating a present position of a road map data delivery requested movable body is drawn.

At this time, it is preferable to recognize a forward direction of road map data received movable body 10, using, for example, direction sensor and to draw the pointer whose arrowed mark can produce the forward direction of movable body 10, as shown in FIG. 6. In FIG. 6, a symbol of 文 denotes a presence of school. After the pointer indicating the position of the corresponding movable body 10 on road map data is drawn, control unit 15 of road map data received movable body 10 controls display unit 13 to display the pointer superimposed road map data on display unit 13 so that a series of processes at the movable body side 10 is ended. On the other hand, after road map data retrieved from road map database 21 is delivered to road map data delivery requested movable body 10, control unit 25 refers to delivery histories stored in delivery history storage unit 22 and determines whether the portion of the road map data delivered presently to corresponding movable body 10 is overlapped on that has delivered in the past. It is noted that the determination of whether the overlapped portion is present as described above is carried out for the road map data of the same size. If the presently delivered road map data is determined to include the portion of the road map data of the same size delivered in the past (Yes) at step S2-4, control unit 25 calculates the degree of the overlap of these road map data at a step S2-5. At this time, the degree of the overlap between the presently delivered road map data and the past delivered one is calculated in the following manner.

Figure 7:
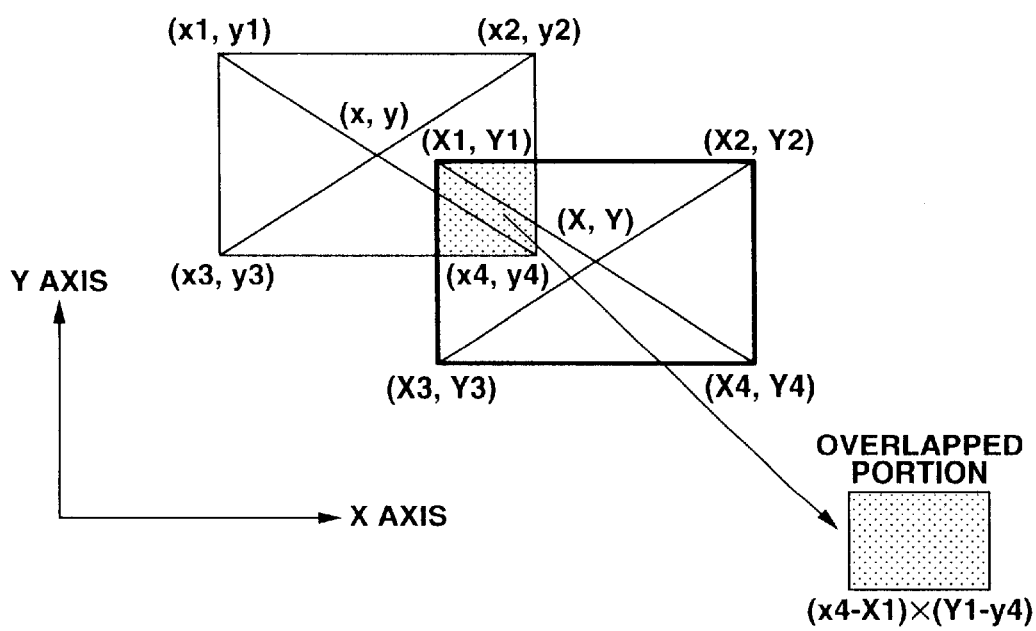
FIG. 7 is an explanatory view representing an example of a method for calculating a degree of an overlap between the road map data delivered at the present time (lately delivered road map data) and that delivered in the past (previously delivered road map data).
Figure 8:
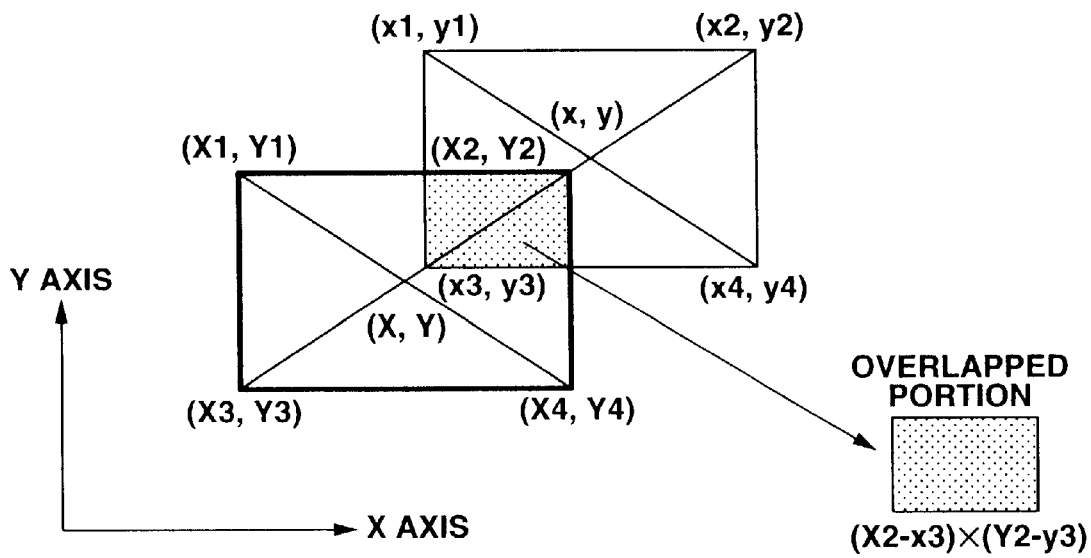
FIG. 8 is an explanatory view representing the example of the method for calculating the degree of the overlap between the road map data delivered at the present time and that delivered in the past.
Figure 9:
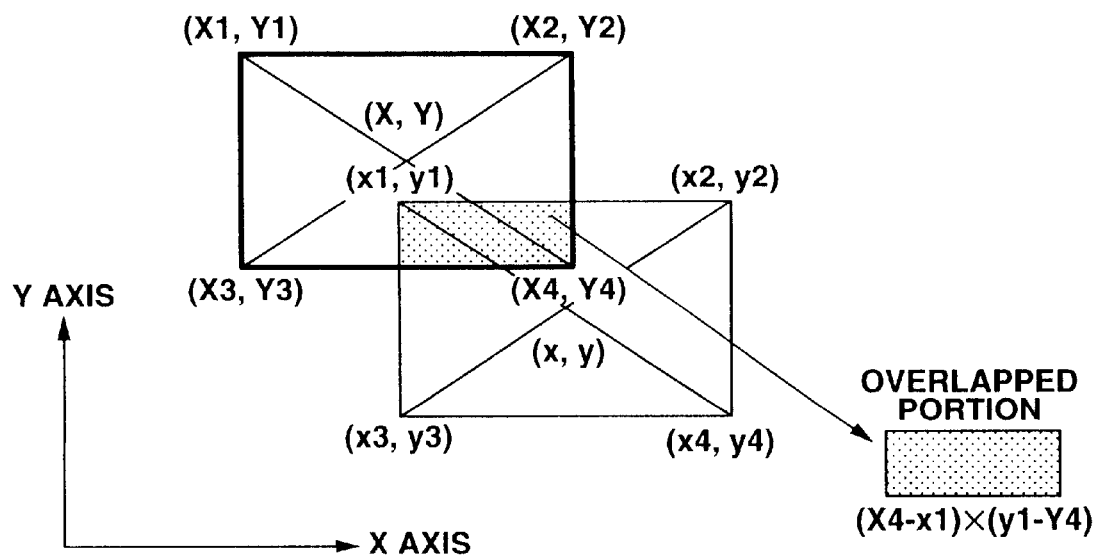
FIG. 9 is an explanatory view representing the example of the method for calculating a degree of an overlap between the road map data delivered at the present time and that delivered in the past.

That is to say, control unit 25 derives the coordinates of the center position and the four corners of each road map data presently delivered and delivered in the past. Then, suppose, first, that the coordinate of the road map data presently delivered road map data is (X, Y) and coordinates of the center position of the road map data delivered in the past is (x, y). The overlaps of these road map data are four cases of $x \leq X$ and $y \geq Y$ (case 1), $x > X$ and $y \geq Y$ (case 2), $x > X$ and $y < Y$ (case 3), and $x \leq X$ and $y < Y$ (case 4). Suppose that a left-upper coordinate thereof is (X1, Y1), a right-upper coordinate of thereof is (X2, Y2), a left-lower coordinate thereof is (x3, Y3), and the right-lower coordinate thereof is (X4, Y4). Suppose that the left-upper coordinate of the road map data delivered in the past is (x1, y1), the right-upper coordinate is (x2, y2), the left-lower coordinate is (x3, y3), and the right-lower coordinate is (x4, y4). The degree of the overlap in the case of case 1 is derived, as shown in FIG. 7, in a form of (x4−X1)×(Y1−y4). The degree of overlap in case 2 is derived, as shown in FIG. 8, in a form of (X2−x3)×(Y2−y3). The degree of overlap in case 3 is derived in the form of (X4, x1)×(y1−Y4), as shown in FIG. 9. In addition, the degree of overlap in case 4 is derived in the form of (x2−X3)×(y2−Y3), as shown in FIG. 10.

Figure 10:
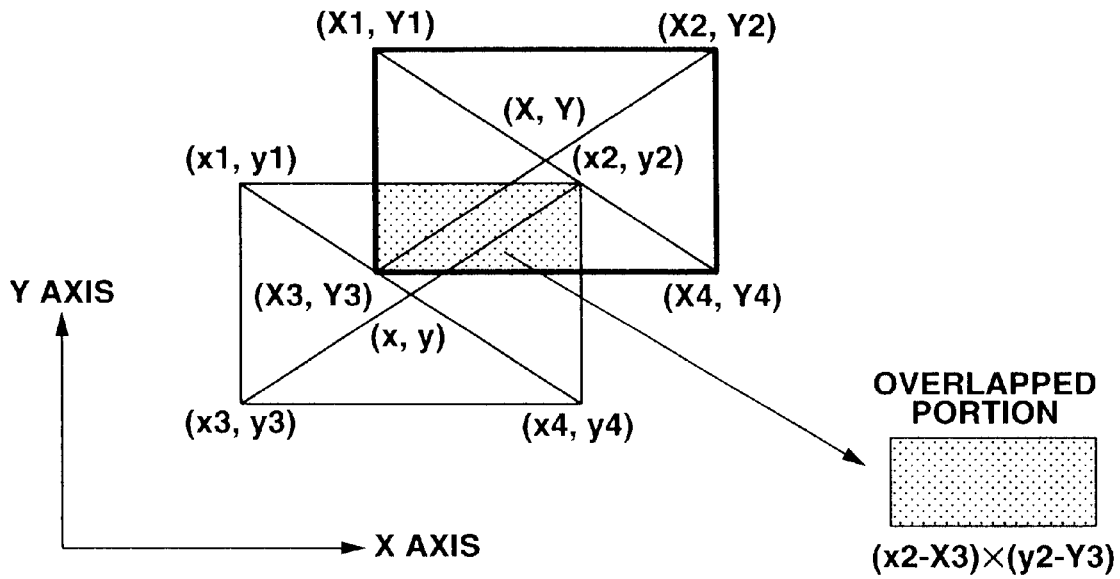
FIG. 10 is an explanatory view representing the example of the method for calculating the degree of the overlap between the road map data delivered at the present time and that delivered in the past.
Figure 11:
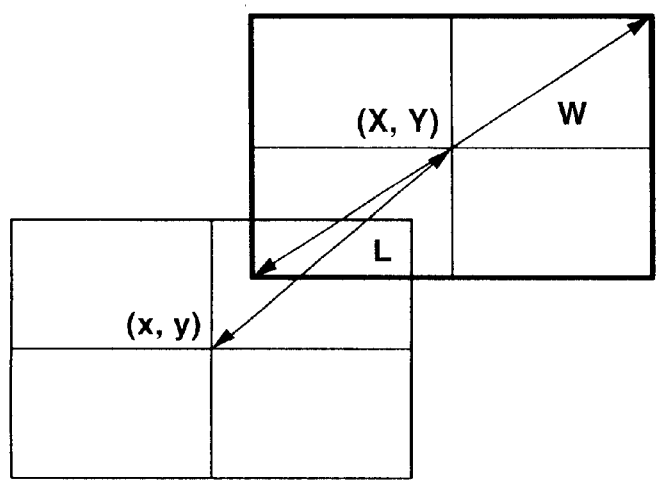
FIG. 11 is an explanatory view representing another example of the method for calculating the degree of an overlap between the road map data delivered at the present time and that delivered in the past.
Figure 12:
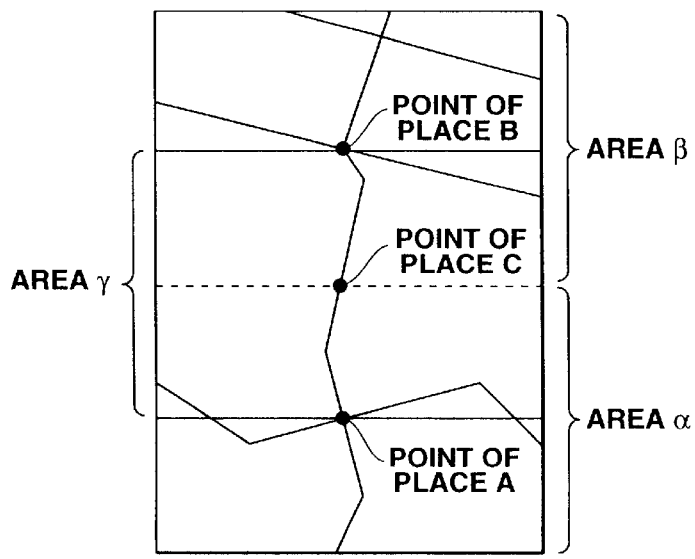
FIG. 12 is an explanatory view for explaining an example of a case wherein the road map data delivered at the present time is overlapped partially on that delivered in the past when the road map data divided with a specified size of an area surrounding a present position of any one of the movable bodies with the present position as a center.
Figure 13:
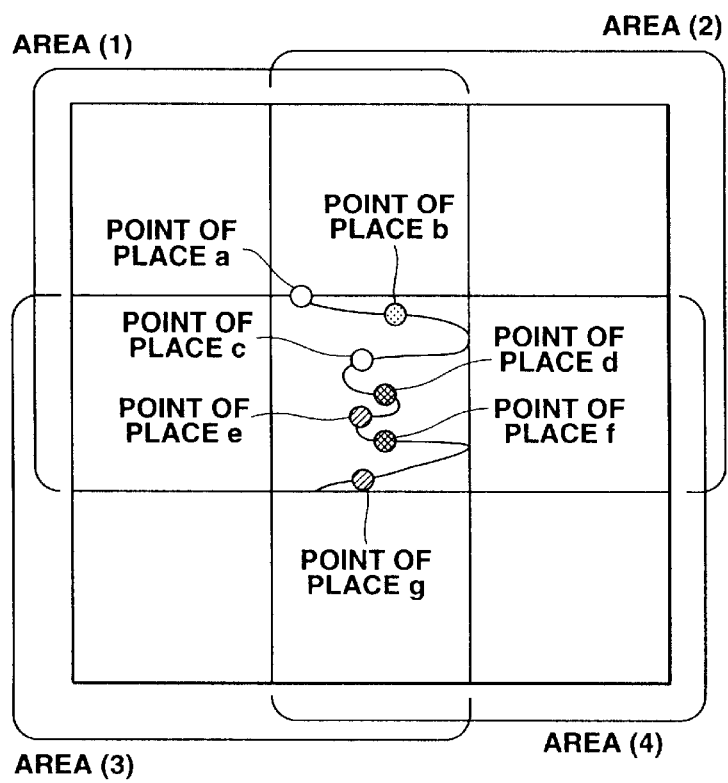
FIG. 13 is an explanatory view for explaining another example of a case wherein the delivered road map data in a case where the road map data is delivered as a mesh data is overlapped partially on that delivered in the past.

In addition, the degree of overlap in case 4 is derived, as shown in FIG. 10, in the form of (x2−X3)×(y2−Y3). In addition, in a case where the degree of overlap between the presently delivered road map data and the road map data delivered in the past is demanded to be derived in a simple manner rather than to derived in an accurate manner, a length of a diagonal line W is determined on the basis of the size of the road map data, as shown in FIG. 11. In addition, a distance L between these center positions is determined on the basis of the coordinates of the center position of the presently delivered road map data and that of the delivered road map data in the past is calculated and, then, a difference between these values (W−L) is calculated. On the basis of the difference (W−L), the degree of the overlap between the presently delivered road map data and the road map data delivered in the past may be derived. In this case, since it is not necessary to determine whether the degree of the overlap corresponds to any one of cases 1 through 4, the degree of overlap of the image data can be determined in the simple manner. After the degree of the overlap between the delivery road map data presently delivered and those delivered in the past is calculated, control unit 25 refers to the charge (account) table stored in the account table storage unit 23 and carries out the charging process to the delivery of the road map data. It is noted that, in a case where a processing capability of control unit 25 is high, control unit 25 may calculate a discounted amount of money in accordance with the degree of the overlap of road map data and may carry out the charging process by this discounted amount of money.

It is also noted that, in a case where control unit 25 determines that the road map data presently delivered does not include the portion thereof delivered in the past (No) at step S2-4, the charging process to the delivery of the road map data is carried out to derive the charge the predetermined amount of money, namely, with no discounted amount of money.

When the charge process to the present delivery of the road map data is carried out, control unit 25 carries out a process such that the various kinds of information (present position and time information and ID (Identification) information) is stored in the delivery history storage unit 22 as the delivery history related to the road map data delivered to the road map delivery requested movable body 10. Thus, the delivery history of the road map data stored in delivery history storage unit 22 is updated and the series of processes at the road map data delivery device 20 is ended.

In road map data delivery system 1 described above, road map data delivery device 20 to which the road map data delivering apparatus according to the present invention is applicable calculates the degree of the overlap of the road map data and carries out the charging process by the discounted amount of money varied in accordance with the calculated degree of the overlap in a case where the road map data including the portion of the overlap on the road map data delivered in the past is delivered to road map data delivery requested movable body 10. Hence, an appropriate charging process in accordance with the utility value of the delivered road map data can be carried out and a satisfactory service can be realized for each user of movable bodies 10.

It is noted that, in the above-described example, road map data delivery device 20 retrieves the road map data of the surrounding area with the specified positional coordinate as a center from road map database 21 and delivers this road map data to road map delivery requested movable body 10. However, with the road map data stored as a mesh data in road map database 21, control unit 25 may retrieve the road map data in the mesh data form from road map database 21 on the basis of a specified mesh code and deliver this road map data to the road map data delivery requested movable body 10.

In this alternative case, the mesh code may be stored in place of four corner coordinates of road map data as the delivery history of the road map data in delivery history storage unit 22. Then, control unit 25 may refer to the delivery histories stored in delivery history storage unit 22, may determine the overlapped portion on the basis of the mesh code, and may carry out the charging process by the discounted rate of money if overlapped portion is found.

In this alternative case, the appropriate charging process in accordance with the utility value of the delivered road map data is carried out in the same way as in the case of the example described above. Hence, a satisfactory service to each of the users of movable bodies 10 can be achieved.

The entire contents of a Japanese Patent Application No. 2001-112533 (filed in Japan on Apr. 11, 2001) are herein incorporated by reference. The scope of the invention is defined with reference to the following claims.

What is claimed is:

1. A road map data delivering apparatus comprising:
   a road map data storing section in which a plurality of road map data are stored;
   a road map data delivering section that, in response to a request to deliver the road map data to a movable body issued from the same movable body, retrieves one of the road map data which corresponds to the delivery requested road map data and delivers the retrieved road map data to the same movable body;
   a delivery history storing section in which a delivery history of each road map data through the road map data delivering section is stored; and
   a charging process section that executes a charging process for the delivery of the road map data carried out by the road map data delivering section in such a manner as to refer to the delivery history of the delivered road map data stored in the delivery history storing section and to charge an amount of money discounted from a predetermined amount of money at a rate of discount varied in accordance with a degree of an overlap in a case where the road map data presently delivered to the road map data delivery requested movable body includes a portion on which the road map data delivered to the same movable body in the past is overlapped.

2. A road map data delivering apparatus as claimed in claim 1, wherein a history data of the delivery history of the road map data which has elapsed for a predetermined interval of time from a time at which the history data of the delivery history of the road map data is stored in the delivery history storing section is deleted from the delivery history storing section.

3. A road map data delivering apparatus as claimed in claim 1, wherein the charging process section inhibits the charging process for a previous delivery of the road map data when the road map data delivering section continually delivers the road map data within a predetermined interval of time.

4. A road map data delivering apparatus as claimed in claim 1, wherein the charging process section calculates the degree of the overlap of the road map data on the basis of a distance between a center of the road map data presently delivered to the road map data delivery requested movable body and that of the road map data delivered in the past to the same movable body.

5. A road map data delivering apparatus as claimed in claim 1, wherein the charging process section extracts the delivery history of the road map data which has the same size as that presently delivered to the road map delivery requested movable body from the delivery histories of the road map data stored in the delivery history storing section and determines whether the road map data presently delivered includes the portion of the overlap on the road map data delivered to the same movable body in the past on the basis of the extracted delivery history.

6. A road map data delivering method comprising:

storing a plurality of road map data;

in response to a request to deliver the road map data to a movable body issued from the same movable body, retrieving one of the road map data which corresponds to the delivery requested road map data;

delivering the retrieved road map data to the same movable body;

storing a delivery history of each road map data delivered in a delivery history storing section; and executing a charging process for the delivery of the road map data in such a manner as to refer to the delivery history of the delivered road map data and to charge an amount of money discounted from a predetermined amount of money at a rate of discount varied in accordance with a degree of an overlap in a case where the road map data presently delivered to the road map data delivery requested movable body includes a portion on which the road map data delivered to the same movable body in the past is overlapped.

7. A road map data delivering method as claimed in claim 6, wherein a history data of the delivery history of the road map data which has elapsed for a predetermined interval of time from a time at which the history data of the delivery history of the road map data is stored is deleted from the delivery history storing section.

8. A road map data delivering method as claimed in claim 6, wherein the charging process for a previous delivery of the road map data is inhibited when the road map data are continually delivered within a predetermined time.

9. A road map data delivering method as claimed in claim 6, wherein the degree of the overlap of the road map data is calculated on the basis of a distance between a center of the road map data presently delivered to the road map data delivery requested movable body and that of the road map data delivered in the past to the same movable body.

10. A road map data delivering method as claimed in claim 6, wherein, when executing the charging process for the delivery of the road map data, the delivery history of the road map data which has the same size as that presently delivered to the road map delivery requested movable body is extracted from the delivery histories of the road map data stored in the delivery history storing section and a determination of whether the road map data presently delivered includes the portion of the overlap on the road map data delivered to the same movable body on the basis of the extracted delivery history is made.

11. A road map data delivering apparatus comprising:

road map data storing means in which a plurality of road map data are stored;

road map data delivering means, in response to a request to deliver the road map data to a movable body issued from the same movable body, for retrieving one of the road map data which corresponds to the delivery requested road map data and for delivering the retrieved road map data to the same movable body;

delivery history storing means in which a delivery history of each road map data through the road map data delivering means is stored; and charging process means for executing a charging process for the delivery of the road map data carried out by the road map data delivering means in such a manner as to refer to the delivery history of the delivered road map data stored in the delivery history storing means and to charge an amount of money discounted from a predetermined amount of money at a rate of discount varied in accordance with a degree of an overlap in a case where the road map data presently delivered to the road map data delivery requested movable body includes a portion on which the road map data delivered to the same movable body in the past is overlapped.

* * * * *